Patented Aug. 9, 1938

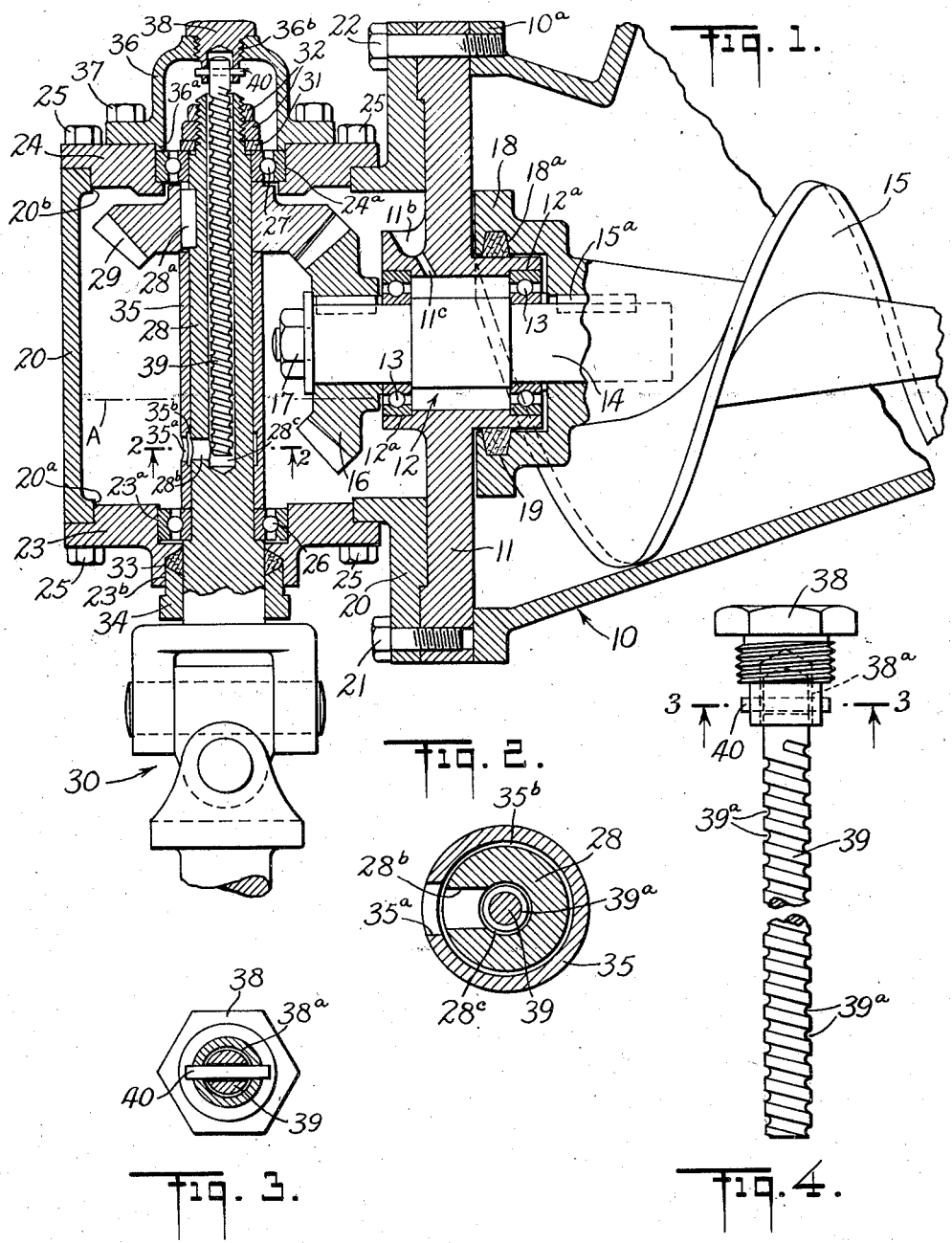

2,125,917

UNITED STATES PATENT OFFICE 2,125,917

STOKER LUBRICATION

William Thompson Hanna, Cincinnati, Ohio

Application June 27, 1935, Serial No. 28,647

19 Claims. (Cl. 184—6)

This invention relates to lubricating apparatus and more particularly to means for lubricating certain of the moving parts of a mechanical stoker or the like.

One of the objects of this invention is to provide a lubricating apparatus for mechanical stokers or the like which is simple and sturdy in construction, reliable in operation and which can be quickly and easily serviced. Other objects will be in part apparent and in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one of various possible embodiments of this invention, Figure 1 shows in elevation a rotary screw for a mechanical stoker and in vertical section driving mechanism therefor embodying the present invention;

Figure 2 is a horizontal section taken along the line 2—2 of Figure 1;

Figure 3 is a horizontal section taken along line 3—3 of Figure 4; and

Figure 4 is an enlarged elevation of a lubricant elevating screw.

Similar reference characters refer to similar parts throughout the several views of the drawing.

Referring to the drawing and more particularly to Figure 1, a housing structure generally indicated at 10 has secured thereto a bearing supporting plate 11 provided with a bore generally indicated at 12. Shoulders 12a extend from opposite ends of bore 12 and house therein ball bearings or the like 13 which rotatably journal a shaft 14. A rotary screw or worm 15 is preferably rigidly secured as by a key 15a to one end of shaft 14, the screw for example being one such as shown in my copending application, Serial No. 625,252. A bevel gear 16 is keyed to the other end of shaft 14 and is secured thereon by a nut and washer 17. The screw 15 includes a hub portion 18 in which is formed a groove 18a for holding a suitable packing washer 19 which runs on one of shoulders 12a. Thus it will be seen that bevel gear 16, shaft 14, and screw conveyer 15 comprise a rotatable unit, the parts being held in related assembly by means of nut and washer 17.

A supporting housing 20 (Figure 1) is mounted upon the face of supporting plate 11 opposite that supporting screw conveyer 15 and is secured thereto in any suitable manner as, for example, by bolts 21. Bolts 22 also secure supporting housing 20 on the face of supporting plate 11 and these latter bolts extend through both the supporting housing and supporting plate into a web 10a of housing 10, thus securing the supporting housing and supporting plate thereto in related assembly. Supporting housing 20 is preferably provided with a lower opening 20a and an upper opening 20b and in these openings are disposed a lower bearing plate 23 and an upper bearing plate 24, these bearing plates being secured to housing 20 by means of bolts 25. It will thus be seen that housing 20, supporting plate 11, and bearing plates 23 and 24 comprise a gear casing in which are disposed the driving parts for screw conveyer 15 as will be more fully described hereinafter.

Still referring to Figure 1, bearing plates 23 and 24 are respectively provided with bores 23a and 24a and within these bores are disposed ball bearings 26 and 27 respectively. A drive shaft 28 is rotatably mounted by ball bearings 26 and 27 and has keyed thereto, as by a key 28a, preferably on the upper portion thereof, a bevel gear 29 which meshes with bevel gear 16. Drive shaft 28 is driven through a universal joint generally indicated at 30 which is in turn driven by suitable operating mechanism (not shown). Thus, rotation of universal joint 30 drives drive shaft 28, bevels 29 and 16, and screw 15 is rotated.

The upper end of drive shaft 28 preferably extends above ball bearing 27 and is suitably threaded. A washer 31 is disposed over the threaded end of shaft 28 and rests upon the inner race of bearing 27 and a pair of nuts 32 are threaded down on the shaft against washer 31 to lock the shaft in its operating position. The lower end of shaft 28 extends through a bore 23b in lower plate 23 and I preferably interpose between the outer surface of shaft 28 and the surface of bore 23b a suitable packing washer 33 and a gland 34 for a purpose to be described hereinafter.

A sleeve 35 or the like is disposed about shaft 28 and interposed between bevel 29 and ball bearing 26, thus acting as a support or spacer for bevel 29. Sleeve 35 has extending therethrough a hole 35a (Figure 2) which communicates with an annular recess 35b formed on the interior surface of the sleeve and with a radial hole 28b extending substantially to the center of shaft 28. Shaft hole 28b in turn communicates with an axial reservoir or well 28c which extends upwardly through shaft 28. The lower portion of the gear casing formed by housing 20 (Figure 1) and lower supporting plate 23 conveniently provides an oil reservoir from which lubricant is at all times free to flow into well or reservoir 28c by way of sleeve hole 35a, recess 35b and shaft hole 28b regardless of the position of hole 28b with respect to sleeve hole 35a. Preferably the level of lubricant is maintained at substantially the level indicated by the line A and thus ensures lubrication of bearings 13.

Preferably I provide a cap 36 (Figure 1) which is secured to the top of upper plate 24 as by bolts 37, the cap thus enclosing the upper portion of shaft 28, nuts 32 and washer 31. Cap 36 also has an annular portion 36a which extends into bore 24a against the top of ball bearing 27 and thus holds the bearing in proper operative position within the bore. A threaded hole 36b extends through the top of cap 36 and threadably receives a plug 38 or the like. As is more clearly shown in Figure 4, plug 38 is preferably bored as at 38a and receives the top end of a screw or lubricant feed bar 39. Screw 39 is preferably smaller in diameter than bore 38a (see Figure 3) and is secured therein by a pin 40 which extends through the walls of bore 38a and the top of screw 39.

As is more clearly shown in Figure 1, feed bar 39 is disposed within shaft well 28c and preferably has a diameter smaller than that of shaft reservoir 28c. Thus the feed bar is freely and loosely suspended within the well and is non-rotatable with respect to the housing 20. As is best shown in Figure 4, feed bar 39 is provided with a spiral groove 39a which provides a capillary pathway for lubricant from the bottom of the well 28c to the top thereof.

In operation, lubricant from the reservoir flows into well 28c and upon rotation of shaft 28 the lubricant is carried upwardly by means of feed bar 39 and shaft 28 to the top of shaft 28 and lubricates ball bearing 27. The lubricant may seep through the ball bearing onto the top of bevel 29 and spread thereover to lubricate not only the meshing surface of bevels 29 and 16 but also ball bearing 13.

It will also be seen that the speed of shaft 28 has some bearing on the feed rate of lubricant well 28c. As is best shown in Figure 1, bearing support plate 11 has formed therein an oil cup 11b or the like which communicates by way of a channel 11c with bore 12. Lubricant is thrown into oil cup 11b during the rotation of bevel 29 and this lubricant together with the lubricant which seeps through ball bearing 13 lubricates the other bearing 13 located on the screw conveyor side of shaft 14. Packing washers 19 and 33 seal the oil within the mechanism and prevent the entrance of coal dust or the like thereinto. Thus shaft 12 and its bearings are assured of lubrication even though the lubricant falls below the level of line A as lubricant will still be supplied by way of screw 39, oil cup 11b and channel 11c.

It may now be seen that all of the bearing surfaces referred to hereinabove are thoroughly lubricated. Accordingly, I have provided an apparatus for lubricating certain of the driving parts of a mechanical stoker or the like which is thoroughly practical and which operates in a highly efficient manner.

As many possible embodiments may be made of the above invention, it is to be understood that all matter hereinbefore set forth is to be interpreted as illustrative and not in a limiting sense.

I claim:

1. In apparatus for driving a rotary fuel moving screw for a stoker, in combination, a casing, a plurality of anti-friction members mounted in said casing, a driving part rotatably mounted by said anti-friction members, said driving part having a bore communicating with the interior of said casing, a screw member disposed within said bore, a driven part extending into said casing, and gear means operatively connecting said parts, said screw member cooperating with one of said parts to lubricate one of said anti-friction members, said gear means and said driven part.

2. In apparatus for driving a rotary fuel moving screw for a stoker, in combination, a casing, a driving member journaled in said casing, said driving member having an axial well extending throughout a portion thereof and a radial hole connecting said axial well with the interior of said casing, said casing being adapted to receive a supply of lubricant, a gear secured to said driving member, a driven member extending into said casing, a gear secured to said driven member and meshing with said first-mentioned gear, and a stationary screw disposed within said well and having its lower end below the level of lubricant within said casing whereby upon operation of said members lubricant is conveyed to the bearing surfaces of said members and to the teeth of said gears.

3. In apparatus for driving a rotary fuel moving screw for a stoker, in combination, a casing, anti-friction members disposed in said casing, a driving part mounted in said anti-friction members, said driving part having an axial well extending throughout a portion thereof and a radial hole connecting said well with the interior of said casing, said casing being adapted to receive a supply of lubricant, a sleeve disposed about a portion of said driving part, said sleeve having a hole and recess adapted to register with said radial hole, a gear secured to said driving part, a driven part journaled by and extending into said casing, a gear secured to said driven part and meshing with said first-mentioned gear, and lubricant conveying means disposed within said well and in contact with the lubricant in said casing and adapted upon operation of said driving part to convey lubricant through said reservoir to lubricate one of said anti-friction members, said gears and said driven part.

4. In apparatus for driving a rotary fuel moving screw for a stoker, in combination, a lubricant reservoir, a driving shaft journaled in said reservoir and having a well extending throughout the upper portion thereof, said well being in communication with the interior of said reservoir, a driven shaft journaled in said casing, gear means connecting one end of said driven shaft with said driving shaft, coal conveying means secured to the other end of said driven shaft and rotatable therewith, and a stationary feed bar freely disposed within the well in said driving shaft and having a spiral groove formed therein, the lower end of said bar being below the level of lubricant in said reservoir whereby upon operation of said driving member lubricant is conveyed through said well and deposited upon the bearing surfaces of said shafts and said gears, and means associated with said shafts for preventing the escape of lubricant from said oil reservoir or the entrance of foreign material therein.

5. In apparatus for driving a rotary fuel moving screw for a stoker, in combination, a lubricant reservoir, a driving shaft disposed within said reservoir and rotatably supported thereby, said shaft having an axial well formed therein and connected to the interior of said reservoir below the lubricant level, a driven shaft extending into said reservoir, gear means operatively connecting said shafts, a coal conveyer secured to and rotatable with said driven shaft, a spirally grooved feed bar freely disposed within said well and having its end below the lubricant level, and means for preventing rotation of said feed bar whereby upon operation of said driving shaft lubricant is conveyed through said well and deposited upon the bearing surfaces of said shafts and upon said gear means.

6. In apparatus for driving a rotary fuel moving screw for a stoker, in combination, a casing, a shaft rotatably mounted in said casing, the upper portion of said shaft having a well communicating with the interior of said casing, said casing being adapted to receive a supply of lubricant, a driven shaft extending into said casing, gear means operatively connecting said shafts, and a stationary screw member freely disposed within said well and having its lower end below the lubricant level, said screw member being effective only upon operation of said shafts to lubricate said shafts and said gear means.

7. In apparatus for driving a rotary fuel moving screw for a stoker, in combination, a casing, a driving element operatively disposed in said casing, said element having a bore communicating with the interior of said casing, a driven element operatively connected to said driving element and disposed in said casing, and a lubricating part freely disposed within said bore and adapted upon operation of said driving element to lubricate the bearings of said elements.

8. In apparatus for driving a rotary fuel moving screw for a stoker, in combination, a casing, a driving element operatively disposed in said casing, said element having an axial bore extending partially therethrough and communicating with the interior of said casing, a driven element operatively connected to said driving element and disposed in said casing, and a lubricating part freely disposed within said bore and adapted upon operation of said driving element to lubricate the bearings of said elements.

9. In apparatus for driving a rotary fuel moving screw for a stoker, in combination, a casing, a driving element extending through and journaled in opposite walls of said casing, said driving element having a bore therein in communication with the interior of said casing, a cap secured to one of said casing walls and covering one end of said driving element, and a lubricating part secured to said cap and disposed within said bore, whereby upon operation of said driving element lubricant is fed through said bore into said cap and about the bearing of said driving element in the wall upon which said cap is mounted.

10. In apparatus for driving a rotary fuel moving screw for a stoker, in combination, a casing, a driving element extending through and journaled in opposite walls of said casing, said driving element having a bore therein in communication with the interior of said casing, a cap secured to one of said casing walls and covering one end of said driving element, and a lubricating part pivotally secured to said cap and freely disposed in said bore, whereby upon operation of said driving element lubricant is fed through said bore into said cap and about the bearing of said driving element in the wall upon which said cap is mounted.

11. In apparatus for driving a rotary fuel moving screw for a stoker, in combination, a casing, a driving element journaled in the walls of said casing, a driven element operatively connected to said driving element and journaled in said casing, said driving element having a bore therein communicating with the interior of said casing and one of the journals of said driving member, and means in said bore effective upon operation of said driving element to lubricate said journal.

12. In apparatus for driving a rotary fuel moving screw for a stoker, in combination, a casing, a driving element journaled in the walls of said casing, a driven element operatively connected to said driving element and journaled in said casing, said driving element having a bore therein communicating with the interior of said casing and one of the journals of said driving member, a lubricant feed bar, and means pivotally mounting said feed bar in said bore whereby operation of said driving element effects lubrication of said journal.

13. In apparatus for driving a rotary fuel moving screw for a stoker, in combination, a driving element having an axial bore therein, and a stationary lubricant feed bar disposed in said bore, the diameter of said feed bar being substantially less than the diameter of said bore, relative movement between said driving element and said bar effecting a flow of lubricant through said bore.

14. In apparatus for driving a rotary fuel moving screw for a stoker, in combination, a casing, and a pair of parts operatively mounted for relative movement therebetween in said casing, one of said parts having a bore in which the other of said parts is disposed, the diameter of said bore being substantially greater than the diameter of said last-mentioned part whereby the surface of said last-mentioned part is spaced from the surface of said bore, one of said surfaces being irregular and adapted upon the occurrence of said relative movement between said parts to effect linear flow of lubricant, the other of said surfaces by its frictional contact with the lubricant being adapted to drive said lubricant about said irregular surface whereby a flow of lubricant through said parts is effected.

15. In apparatus for driving a rotary fuel moving screw for a stoker, in combination, a driving member, a driven member operatively connected to said driving member, means forming bearings for said members, a lubricating part operatively associated with said driving member, and stationary means associated with the bearings of said driven member for receiving lubricant deposited on said driving member by said lubricating part during the lubricating action thereof, said last mentioned means being adapted to lubricate the bearings of said driven member.

16. In apparatus for driving a rotary fuel moving screw for a stoker, in combination, a casing, a drive shaft journaled in the walls of said casing, said shaft having an axial bore formed therein, a gear mounted on said drive shaft, a driven shaft journaled in said casing, a gear mounted on said driven shaft and meshing with the driving gear, a lubricating part disposed in said bore, means preventing rotation of said lubricating part, said lubricating part being effective upon rotation of said drive shaft to cause a flow of lubricant through said bore about the bearing of said drive shaft in said casing and upon said driving gear, and means associated with the bearing of said driven shaft for receiving lubricant centrifugally thrown from said driving gear for lubricating said driven shaft.

17. As an article of manufacture, a lubricant feed screw, a support for said screw, and means connecting said screw and said support while permitting non-rotary relative motion therebetween.

18. In apparatus for driving a rotary fuel moving screw for a stoker, in combination, a casing, a driving member journaled in said casing, said member having a bore therein in communication with the interior of said casing, a sleeve disposed about a portion of said driving member, said sleeve being bored and recessed at the portion thereof adjacent the portion of the bore in said driving member which effects communication between said bore and the interior of said casing, and lubricant conveying means disposed within said bore and adapted upon operation of said driving member to effect a flow of lubricant through the bore and recess of said sleeve and thence through the bore in said driving member to lubricate the bearing thereof.

19. In apparatus for driving a rotary fuel moving screw for a stoker, in combination, a gear casing, a driving member operatively borne by said gear casing, a driven member extending into said gear casing and operatively borne thereby, gear means operatively connecting said members, and stationary means cooperative with said driving member to lubricate said members and said gear means, the bearing of said driven member depending for lubrication upon said stationary means and said driving member.

WILLIAM THOMPSON HANNA.